Aug. 18, 1970    R. D. OGG    3,524,348
MARINE SPEED INDICATOR
Filed Nov. 26, 1968
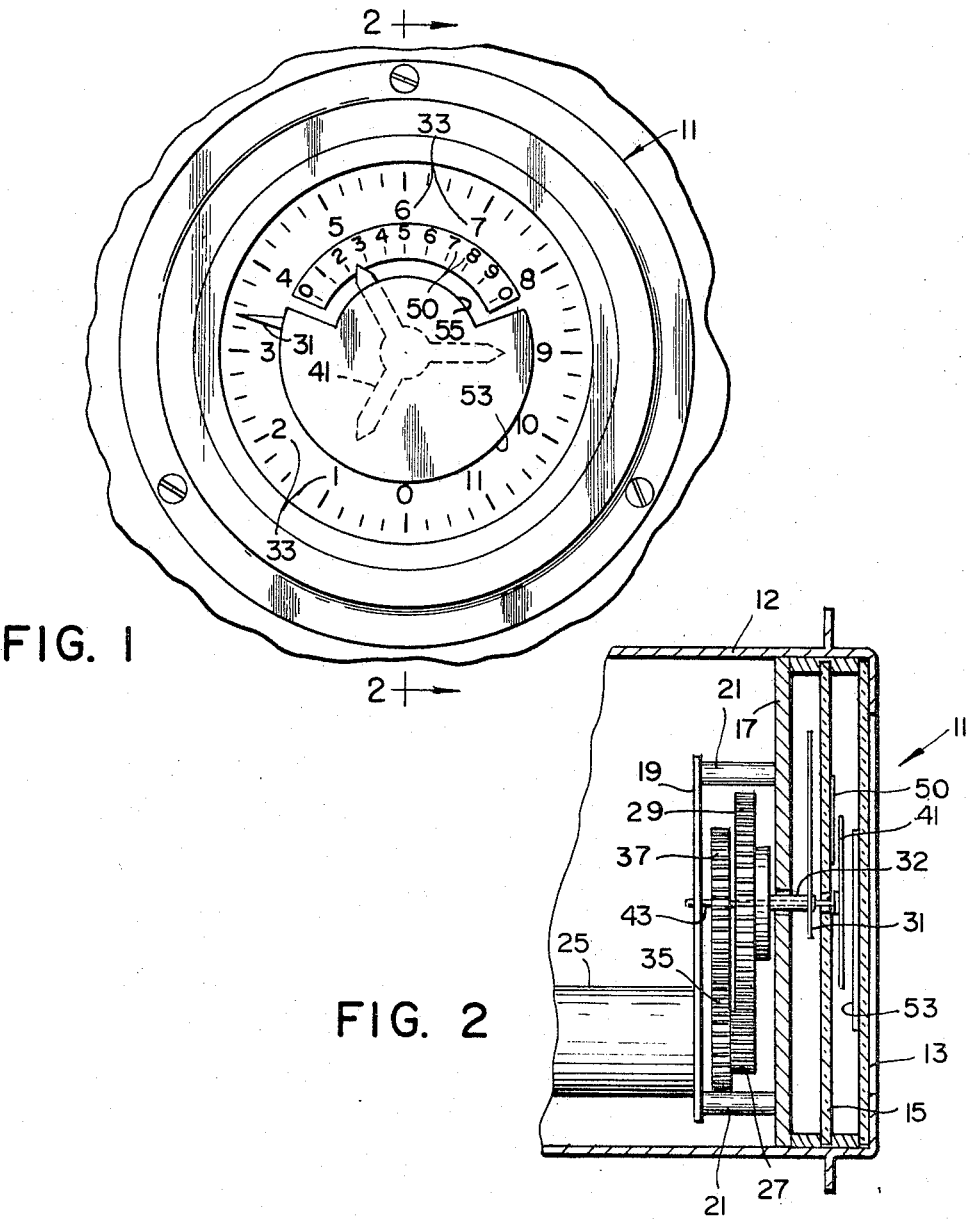
FIG. 1
FIG. 2
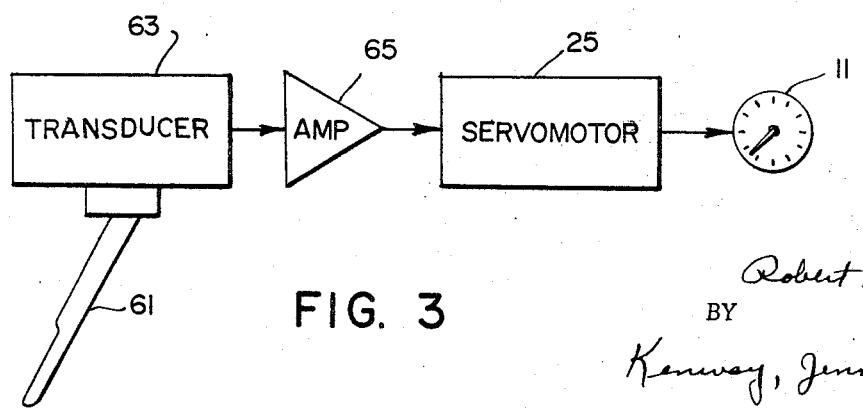
FIG. 3
INVENTOR.
Robert D. Ogg
BY
Kenway, Jenney + Hildreth
ATTORNEYS 3,524,348
MARINE SPEED INDICATOR
Robert D. Ogg, North Windham, Maine, assignor to The Eastern Company, Naugatuck, Conn., a corporation of Connecticut
Filed Nov. 26, 1968, Ser. No. 779,082
Int. Cl. G01c 21/00
U.S. Cl. 73—186                    4 Claims

ABSTRACT OF THE DISCLOSURE

The marine speed indicator disclosed herein employs a pointer for registering overall speed on a coarse scale and a multipointed indicator for registering vernier speed on a finely graduated scale. A mask is provided for obscuring all but one of the points of the indicator thereby to give an unambiguous indication of vernier speed.

BACKGROUND OF THE INVENTION

This invention relates to marine speed indicators and more particularly to such an indicator which provides an unambiguous vernier indication of speed simultaneously with an overall speed indication.

Various marine speedometers have been devised heretofore which would selectively provide either an overall or a vernier indication of speed, e.g. by throwing a switch to change scales, or which would provide both overall and vernier indications simultaneously but in an ambiguous manner, e.g. using multipointed indicators in which all points of the indicator are always visible so that the display presented is somewhat confusing or ambiguous to the observer.

Among the several objects of the present invention may be noted the provision of a marine speed indicator which provides both an overall and a vernier indication of speed simultaneously; the provision of such an indicator which provides such simultaneous indications unambiguously; and the provision of such an indicator which is reliable, simple in construction, and relatively inexpensive. Other objects and features will be in part apparent and in part pointed out hereinafter.

SUMMARY OF THE INVENTION

Briefly, a marine speed indicator of this invention includes a circular dial face and a pointer pivotally mounted for rotation on an axis passing through the center of the face. A multipointed indicator is provided which is pivotally mounted for rotation concentrically with the pointer. Gearing is provided to couple the pointer and the multipointed indicator for simultaneous rotation, the rotation of the indicator being substantially faster that the rotation of the pointer. The pointer and indicator together are driven in response to a signal generated by a speed sensing transducer. A mask obscures all but one of the points of the indicator and, accordingly, the pointer provides an overall indication of speed while the indicator simultaneously provides an unambiguous vernier indication of speed.

BRIEF DESCRIPTION OF THE DRAWINGS

FIG. 1 is a front view of a marine speed indicator of this invention;

FIG. 2 is a section taken substantially on the line 2—2 of FIG. 1; and

FIG. 3 is a block diagram of a servo system for controlling the indicator.

Corresponding reference characters indicate corresponding parts through the several views of the drawings.

DESCRIPTION OF THE PREFERRED EMBODIMENT

Referring now to FIG. 1, a marine speed indicator 11 of this invention is illustrated as being mounted in a conventional marine instrument case 12 which may, for example, be constructed of brass. As may be seen in FIG. 2, the instrument includes a generally transparent face plate 13, a generally transparent intermediate plate 15 and an opaque circular dial face 17. In addition to carrying a suitable speed scale, the dial face 17 also acts as a mounting plate for the indicator drive mechanism. For this purpose, a support plate 19 is mounted on dial face 17 by means of spacers 21. In the preferred embodiment illustrated, the indicator mechanism is driven by a servo motor 25. Servo motor 25 may also drive, through suitable gearing, one or more position sensing potentiometers so that the servo motor can be energized in a feedback control loop, as disclosed in greater detail in my copending application Ser. No. 769,331 filed Oct. 21, 1968 and entitled Marine Speedometer (File 159B).

Servo motor 25, operating through a pair of gears 27 and 29, drives a relatively large pointer 31 which is connected to gear 29 by means of a tubular shaft 32. In cooperation with indicia 33 printed on the front surface of the dial face 17, the pointer 31 indicates overall speed in suitable units, e.g. knots up to a maximum speed of 12 knots. Servo motor 25, operating through a pair of gears 35 and 37, also drives a multipointed indicator 41 which is connected to gear 37 by means of a shaft 43 which passes coaxially through the tubular shaft 32 which carries pointer 31. The gear ratios are selected so that the rotation of the indicator 41 is much faster than that of the pointer 31. In the preferred example illustrated, the indicator 41 rotates four times as fast as the pointer 31. The indicator 41 thus provides a vernier indication of speed. For registering vernier speeds, indicia 50 are provided on intermediate plate 15 to provide a scale, e.g., representing tenths of a knot, against which the position of the points of indicator 41 can be referenced. In view of the gear ratios stated previously it will be understood that this scale subtends a range of substantially 120°.

A mask 53 is mounted on the inside surface of the face plate 13. The mask is shaped so as to obscure all but one of the points of indicator 41 for most positions of the indicator. As illustrated, the mask 53 is of generally circular shape except for a cut-out section 55 which is of reduced diameter and subtends an angle of about 120°, the cut-out section being in registration with the indicia 50.

A typical system for controlling the indicator of FIGS. 1 and 2 is illustrated in FIG. 3. Relative fluid velocity is sensed by a drag strut 61. Strut 61 is resiliently mounted, e.g. by means of a torsion bar, so that its deflection varies as a function of the velocity of the fluid past the strut. The strut is adapted to extend through the hull of a racing sailboat thereby to sense the speed of the boat relative to the body of water through which the boat passes.

The deflection of strut 61 is sensed by a transducer 63 which provides an electrical signal which varies as a function of speed. The signal is in turn amplifier, as indicated at 65, and applied ot the servo motor 25 so as to drive the indicator 11. Preferably, this servo system comprises a feedback loop which produces a linear indication of speed as is described in greater detail in my aforementioned copending application. With such a system, the rotations of the pointer 31 and the indicator 41 are directly proportion to speed. Thus the pointer 31 will register overall speed on the scale provided by indicia 33 while the indicator 41 registers vernier speed on the concentric scale provided by the indicia 50. As the indicator 41 rotates, successive points of the indicator will come into view just as each preceding point passes out of view. Accordingly, it can be seen that an unambiguous indication of vernier speed is provided by the indicator 41 simultaneously with the overall indication provided by the pointer 31 and that both indications may be readily perceived and understood.

In view of the above, it will be seen that the several objects of the present invention are achieved and other advantageous results are attained.

As various changes could be made in the above constructions without departing from the scope of the invention, it is intended that all matter contained in the above description or shown in the accompanying drawings shall be interpreted as illustrative and not in a limiting sense.

What is claimed is:

1. A marine speed indicator comprising:
   a circular dial face;
   a pointer pivotally mounted for rotation about an axis passing through the center of said face;
   a multipointed indicator pivotally mounted for rotation concentrically with said pointer;
   gear means coupling said pointer and said multipointed indicator for simultaneous rotation, the rotation of said indicator being substantially faster than the rotation of said pointer;
   a mask for obscuring all but one of the points of said indicator for most positions of said indicator;
   a transducer for providing a signal which varies as a function of relative fluid velocity; and
   motor means, responsive to said signal, for driving said pointer and indicator as a function of relative fluid velocity whereby said pointer provides an overall indication of speed and said indicator simultaneously provides an ambiguous vernier indication of speed.

2. A marine speed indicator as set forth in claim 1 wherein said indicator has three points.

3. A marine speed indicator as set forth in claim 2 wherein said mask is of generally circular configuration except for a section of reduced diameter, which section subtends an angle of about 120°.

4. A marine speed indicator comprising:
   means providing a first scale representing overall speed;
   a pointer pivotally mounted for registering speed on said first scale;
   means providing a second scale representing vernier speed, said second scale being concentric with said first scale;
   a multipointed indicator for registering speed on said second scale, said indicator being pivotally mounted for rotation concentrically with said pointer;
   mear means coupling said pointer and said indicator for simultaneous rotation, the extent of rotation of said pointer being an integer multiple of the extent of rotation of said pointer; and
   a mask for substantially obscuring all but one of the points of said indicator, said mask being of generally circular configuration except for a section of reduced diameter which is in registration with said second scale;
   a transducer for providing a signal which varies as a function of relative fluid velocity; and
   motor means, responsive to said signal, for driving said pointer and indicator as a function of relative fluid velocity whereby said pointer provides an overall indication of speed and said indicator simultaneously provides an unambiguous vernier indication of speed.

References Cited

UNITED STATES PATENTS 3,468,163   9/1969   Kenyon _____ 73—186

DONALD O. WOODIEL, Primary Examiner

U.S. Cl. X.R.

116—116, 129

CERTIFICATE OF CORRECTION

Patent No. 3,524,348    Dated August 18, 1970

Inventor(s) Robert D. Ogg

It is certified that error appears in the above-identified patent and that said Letters Patent are hereby corrected as shown below:

In claim 1, column 3, line 33, change "ambiguous" to - unambiguous -

In claim 4, column 4, line 13, change "mear" to - gear -

SIGNED AND
SEALED
OCT 27 1970

(SEAL)
Attest:

Edward M. Fletcher, Jr.
Attesting Officer

WILLIAM E. SCHUYLER, JR.
Commissioner of Patents